US012312182B2

(12) United States Patent
Hart et al.

(10) Patent No.: US 12,312,182 B2
(45) Date of Patent: May 27, 2025

(54) ROBOTIC ARM SYSTEM

(71) Applicant: Black-I Robotics, Inc., Tyngsboro, MA (US)

(72) Inventors: Brian Hart, Bedford, MA (US); Martin Cosgrove, Mashpee, MA (US); James Dowling, New Boston, NH (US); Richard Hart, Ft. Worth, TX (US); Ryan Mulley, Amherst, NH (US); Jonathan Roche, Hudson, NH (US)

(73) Assignee: BLACK-I ROBOTICS, INC., Tyngsboro, MA (US)

( * ) Notice: Subject to any disclaimer, the term of this patent is extended or adjusted under 35 U.S.C. 154(b) by 0 days.

(21) Appl. No.: 17/111,898

(22) Filed: Dec. 4, 2020

(65) Prior Publication Data

US 2021/0171294 A1 Jun. 10, 2021

Related U.S. Application Data

(60) Provisional application No. 63/102,469, filed on Jun. 15, 2020, provisional application No. 62/974,359, filed on Dec. 4, 2019.

(51) Int. Cl.
*B25J 9/04* (2006.01)
*B25J 9/00* (2006.01)
(Continued)

(52) U.S. Cl.
CPC ............ *B65G 47/91* (2013.01); *B25J 9/0093* (2013.01); *B25J 9/023* (2013.01); *B25J 9/04* (2013.01);
(Continued)

(58) Field of Classification Search
CPC ....... B25J 9/023; B25J 9/04; B25J 9/14; B25J 9/1697; B25J 15/04; B25J 19/0025; B25J 9/162; B25J 19/021
See application file for complete search history.

(56) References Cited

U.S. PATENT DOCUMENTS 7,854,108 B2 * 12/2010 Koselka ................ G05D 1/021
701/50
8,322,249 B2 12/2012 Seavey et al.
(Continued)

FOREIGN PATENT DOCUMENTS

| CN | 207300074 U | * | 5/2018 |
| WO | WO 2018/022265 | * | 2/2018 |
| WO | 2021113612 A1 | | 6/2021 |

OTHER PUBLICATIONS

International Search Report and Written Opinion issued in related Application Serial No. PCT/US2020/063266 on Mar. 3, 2021.
Non-Final Office Action issued in related U.S. Appl. No. 18/189,070 on Aug. 1, 2024.
Final Office Action issued in related U.S. Appl. No. 18/189,070 on Mar. 31, 2025.

*Primary Examiner* — William C Joyce
(74) *Attorney, Agent, or Firm* — Brian J. Colandreo; Heath M. Sargeant; Holland & Knight LLP (57) ABSTRACT

A detachable, self-contained robotic arm system includes: a mounting subsystem configured to releasable engage an operating platform; a robotic arm subsystem coupled to the mounting subsystem; a control subsystem coupled to the mounting subsystem and configured to effectuate movement of the robotic arm assembly; and a connectivity subsystem configured to detachably couple the detachable, self-contained robotic arm system to one or more external systems.

27 Claims, 3 Drawing Sheets

(51) Int. Cl.
  *B25J 9/02*      (2006.01)
  *B25J 9/14*      (2006.01)
  *B25J 9/16*      (2006.01)
  *B25J 15/04*     (2006.01)
  *B25J 17/02*     (2006.01)
  *B25J 19/00*     (2006.01)
  *B25J 19/02*     (2006.01)
  *B65G 47/91*     (2006.01)

(52) U.S. Cl.
  CPC ............... *B25J 9/14* (2013.01); *B25J 9/1697* (2013.01); *B25J 15/04* (2013.01); *B25J 17/02* (2013.01); *B25J 19/0025* (2013.01); *B25J 19/021* (2013.01); *B25J 9/162* (2013.01)

(56) References Cited

U.S. PATENT DOCUMENTS

| | | | |
|---|---|---|---|
| 9,346,160 B2 * | 5/2016 | Edsinger | B25J 9/0096 |
| 9,827,678 B1 * | 11/2017 | Gilbertson | B25J 9/1682 |
| 10,065,314 B2 * | 9/2018 | Tian | G05D 1/0214 |
| 2007/0162174 A1 | 7/2007 | Doke et al. | |
| 2010/0039380 A1 | 2/2010 | Lanier | |
| 2011/0257786 A1 | 10/2011 | Caron L'Ecuyer et al. | |
| 2012/0048207 A1 | 3/2012 | Hofman et al. | |
| 2019/0079532 A1 * | 3/2019 | Crawley | G01S 17/931 |
| 2019/0381670 A1 * | 12/2019 | Correll | B25J 9/1697 |
| 2020/0182623 A1 | 6/2020 | Huang et al. | |
| 2021/0031361 A1 * | 2/2021 | Morey | B25J 19/0029 |
| 2022/0300000 A1 | 9/2022 | Poluboiarinov | |

\* cited by examiner

ROBOTIC ARM SYSTEM

RELATED APPLICATION(S)

This application claims the benefit of the following: U.S. Provisional Application No. 62/974,359, filed on 4 Dec. 2019 and U.S. Provisional Application No. 63/102,469, filed on 15 Jun. 2020, the entire contents of which are incorporated herein by reference.

TECHNICAL FIELD

This disclosure relates to robotic arms and, more particularly, to self-contained robotic arms.

BACKGROUND

Robotic arms are used in industry to automate tasks. For example, such robotic arms may be used to pick up objects, assembly cars, weld metal, machine material, lift heavy objects, and repeatedly perform redundant tasks. As such robotic arms tend to be heavy, they tend to be permanently mounted to rigid bases. For example, such robotic arms may be mounted to a cement base that is proximate an assembly line.

Unfortunately, such a configuration results in robotic arms that are essentially non-moveable. While these robotic arms may be removed from their rigid base to be relocated, it is a complicated process because a new rigid base would need to be constructed and new data and power connections would need to be plumbed.

SUMMARY OF DISCLOSURE

In one implementation, a detachable, self-contained robotic arm system includes: a mounting subsystem configured to releasable engage an operating platform; a robotic arm subsystem coupled to the mounting subsystem; a control subsystem coupled to the mounting subsystem and configured to effectuate movement of the robotic arm assembly; and a connectivity subsystem configured to detachably couple the detachable, self-contained robotic arm system to one or more external systems.

One or more of the following features may be included. The connectivity subsystem may include one or more of: a data connectivity subsystem configured to effectuate communication between the detachable, self-contained robotic arm system and an external control device; and a power connectivity subsystem configured to provide external power to the detachable, self-contained robotic arm system. The control subsystem may include one or more of: a pneumatic control subsystem; a electric control subsystem; and a hydraulic control subsystem. The pneumatic control subsystem may include one or more of: pneumatic controls; one or more pneumatic actuators; an air compressor; and an air storage tank. The electric control subsystem may include one or more of: electronic controls; and one or more electronic actuators. The hydraulic control subsystem may include one or more of: hydraulic controls; one or more hydraulic actuators; a hydraulic pump; and a hydraulic fluid storage tank. A machine vision system may be configured to enable a user of the detachable, self-contained robotic arm system to visually monitor areas proximate the detachable, self-contained robotic arm system. An audio system may be configured to enable a user of the detachable, self-contained robotic arm system to audibly monitor areas proximate the detachable, self-contained robotic arm system. The detachable, self-contained robotic arm system may include a conveyor system. The conveyor system may be configured to receive objects from and/or provide objects to the robotic arm subsystem. The conveyor system may be configured to receive a pallet. The mounting subsystem may be configured to releasably engage the operating platform with one or more of: releasable fasteners; releasable clamps; and releasable grasping assemblies. The robotic arm subsystem may include one or more of: an arm base assembly; a shoulder joint assembly coupled to the arm base assembly; an upper arm assembly coupled to the should joint assembly; an elbow joint assembly coupled to the upper arm assembly; a lower arm assembly coupled to the elbow joint assembly; a wrist joint assembly coupled to the lower arm assembly; and a gripper assembly coupled to the wrist joint assembly. The shoulder joint assembly may be configured to enable rotation about one or more of the X, Y and Z axis. The elbow joint assembly may be configured to enable rotation about one or more of the X, Y and Z axis. The wrist joint assembly may be configured to enable rotation about one or more of the X, Y and Z axis. The operating platform may be a moveable operating platform. The moveable operating platform may include one or more of: an autonomous mobile base; a non-autonomous mobile base; a forklift; and a truck.

In another implementation, a detachable, self-contained robotic arm system includes: a mounting subsystem configured to releasable engage an operating platform; a robotic arm subsystem coupled to the mounting subsystem; a control subsystem coupled to the mounting subsystem and configured to effectuate movement of the robotic arm assembly; and a connectivity subsystem configured to detachably couple the detachable, self-contained robotic arm system to one or more external systems, wherein the connectivity subsystem includes one or more of: a data connectivity subsystem configured to effectuate communication between the detachable, self-contained robotic arm system and an external control device, and a power connectivity subsystem configured to provide external power to the detachable, self-contained robotic arm system.

One or more of the following features may be included. The control subsystem may include one or more of: a pneumatic control subsystem; a electric control subsystem; and a hydraulic control subsystem. The pneumatic control subsystem may include one or more of: pneumatic controls; one or more pneumatic actuators; an air compressor; and an air storage tank. The electric control subsystem may include one or more of: electronic controls; and one or more electronic actuators. The hydraulic control subsystem may include one or more of: hydraulic controls; one or more hydraulic actuators; a hydraulic pump; and a hydraulic fluid storage tank. The detachable, self-contained robotic arm system may include a conveyor system. The conveyor system may be configured to receive objects from and/or provide objects to the robotic arm subsystem. The conveyor system may be configured to receive a pallet.

In another implementation, a detachable, self-contained robotic arm system includes: a mounting subsystem configured to releasable engage an operating platform; a robotic arm subsystem coupled to the mounting subsystem; a control subsystem coupled to the mounting subsystem and configured to effectuate movement of the robotic arm assembly; and a connectivity subsystem configured to detachably couple the detachable, self-contained robotic arm system to one or more external systems, wherein the connectivity subsystem includes one or more of: a data connectivity subsystem configured to effectuate communication between the detachable, self-contained robotic arm system and an external control device, and a power connectivity subsystem configured to provide external power to the detachable, self-contained robotic arm system; wherein the control subsystem includes one or more of: a pneumatic control subsystem; a electric control subsystem; and a hydraulic control subsystem.

One or more of the following features may be included. The pneumatic control subsystem may include one or more of: pneumatic controls; one or more pneumatic actuators; an air compressor; and an air storage tank. The electric control subsystem may include one or more of: electronic controls; and one or more electronic actuators. The hydraulic control subsystem may include one or more of: hydraulic controls; one or more hydraulic actuators; a hydraulic pump; and a hydraulic fluid storage tank.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
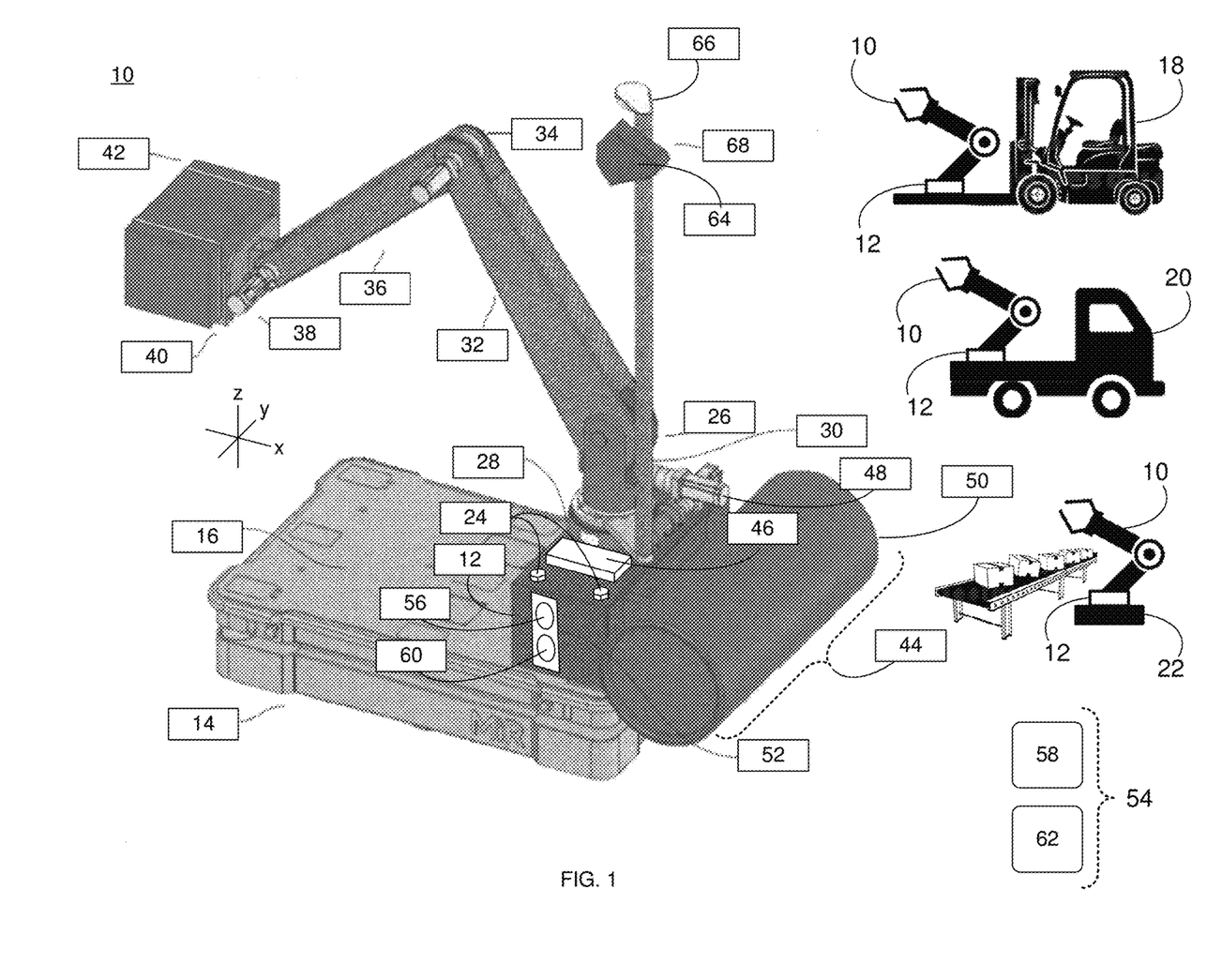
FIG. 1 is an isometric view of a detachable, self-contained robotic arm system according to an embodiment of the present disclosure.

Referring to FIG. 1, there is shown detachable, self-contained robotic arm system 10. As will be discussed below in greater detail, detachable, self-contained robotic arm system 10 is configured to be self-contained, thus allowing it to be easily moveable from one operating environment to another.

Detachable, self-contained robotic arm system 10 may include mounting subsystem 12 configured to releasable engage operating platform 14. For example and as will be discussed below in greater detail, mounting subsystem 12 may be a rigid and compact base that allows for easy attachment to (and detachment from) operating platform 14. Accordingly, mounting subsystem 12 may be constructed of plate steel, may be compact in size, and may be used as a mounting point for all of the systems/subsystems of detachable, self-contained robotic arm system 10, thus allowing detachable, self-contained robotic arm system 10 to be easily attached to (and detached from) operating platform 14 as a single/solitary unit.

The configuration of operating platform 14 may vary depending upon the operating environment of detachable, self-contained robotic arm system 10. For example, operating platform 14 may be a moveable operating platform or a stationary operating platform.

Examples of a moveable operating platform (i.e., operating platform 14) may include but are not limited to: autonomous mobile base 16 (e.g., an intelligent mobile base that is fully (or partially) autonomous and is used within an automated warehouse); a non-autonomous mobile base (e.g., a non-intelligent mobile base that is manually driven/controlled by a user; not shown); forklift 18 (e.g., that is configured to receive detachable, self-contained robotic arm system 10); and truck 20 (e.g., that is configured to receive detachable, self-contained robotic arm system 10).

An example of a stationary operating platform (i.e., operating platform 14) may include but is not limited to: assembly line stationary base 22 (that is positioned proximate an assembly line).

Mounting subsystem 12 may be configured to releasably engage operating platform 14 with one or more assemblies (e.g., assemblies 24), examples of which may include but are not limited to: one or more releasable fasteners (e.g., nut and bolt assemblies); one or more releasable clamps (e.g., leverage-based clamps); and one or more releasable grasping assemblies (e.g., screw-type clamps). Accordingly and through the use of assemblies 24, mounting subsystem 12 may be quickly and easily detached from operating platform 14. And since (as discussed above) mounting subsystem 12 may be used as a mounting point for all of the systems/subsystems of detachable, self-contained robotic arm system 10, detachable, self-contained robotic arm system 10 may be easily attached to (and detached from) operating platform 14 as a single/solitary unit.

Detachable, self-contained robotic arm system 10 may include robotic arm subsystem 26 coupled (i.e., directly or indirectly) to mounting subsystem 12. Robotic arm subsystem 26 may include one or more of:

Arm Base Assembly: Arm base assembly 28 may be coupled to mounting subsystem 12 and may be configured to allow detachable, self-contained robotic arm system 10 to rotate about the Z-axis with respect to mounting subsystem 12.

Shoulder Joint Assembly: Shoulder joint assembly 30 may be coupled to arm base assembly 28 and may be configured to allow upper arm assembly 32 rotate about the Y-axis with respect to arm base assembly 28. Additionally, shoulder joint assembly 30 may be configured to allow for more complex movements. For example, shoulder joint assembly 30 may also be configured to enable rotation about one or more of the X and Z axes.

Upper Arm Assembly: Upper arm assembly 32 may be coupled to shoulder joint assembly 30 and may be constructed of various materials, such steel, aluminum, titanium and carbon fiber. Additionally, upper arm assembly 32 may be configured to be longitudinally-extendable along the longitudinal axis of upper arm assembly 32, thus enabling detachable, self-contained robotic arm system 10 to have an extended reach when needed.

Elbow Joint Assembly: Elbow joint assembly 34 may be coupled to upper arm assembly 32 and may be configured to allow lower arm assembly 36 to rotate about the Y-axis with respect to upper arm assembly 32. Additionally, elbow joint assembly 34 may be configured to allow for more complex movements. For example, elbow joint assembly 34 may also be configured to enable rotation about one or more of the X and Z axes.

Lower Arm Assembly: Lower arm assembly 36 may be coupled to elbow joint assembly 34 and may be constructed of various materials, such steel, aluminum, titanium and carbon fiber. Additionally, lower arm assembly 36 may be configured to be longitudinally-extendable along the longitudinal axis of lower arm assembly 36, thus enabling detachable, self-contained robotic arm system 10 to have an extended reach when needed.

Wrist Joint Assembly: Wrist joint assembly 38 may be coupled to lower arm assembly 36 and may be configured to allow gripper assembly 40 to rotate about the Y-axis with respect to lower arm assembly 36. Additionally, wrist joint assembly 38 may be configured to allow for more complex movements. For example, wrist joint assembly 38 may also be configured to enable rotation about one or more of the X and Z axes.

Gripper Assembly: Gripper assembly 40 may be coupled to wrist joint assembly 38 and may be configured to grasp various objects. For example, gripper assembly 40 may include a pair of forks (not shown) for releasably engaging and lifting a pallet. Additionally/alternatively, gripper assembly 40 may include a pair of tongs (not shown) for releasably grasping individual items (e.g., boxes, cartons, assemblies). Additionally/alternatively, gripper assembly 40 may include one or more suctions devices (e.g., suction cups; not shown) for generating a vacuum to releasably grasp individual items having a smooth surface upon which a vacuum may be drawn (e.g., boxes, cartons).

Accordingly and depending upon the manner in which gripper assembly 40 is configured, robotic arm subsystem 26 may be configured to grasp various objects (generally represented as object 42), wherein examples of object 42 may include but are not limited to assemblies, discrete items, boxed discrete items, cartons of boxed items, and loaded pallets.

Detachable, self-contained robotic arm system 10 may include control subsystem 44 coupled (i.e., directly or indirectly) to mounting subsystem 12 and configured to effectuate movement of robotic arm assembly 10. Depending upon the manner in which detachable, self-contained robotic arm system 10 is configured, control subsystem 44 may include one or more of: a pneumatic control subsystem; an electric control subsystem; and a hydraulic control subsystem.

For example, control subsystem 44 may include a pneumatic control subsystem when it is desired for robotic arm subsystem 26 to effectuate rapid movement (as pneumatic actuators tend to respond more quickly than electric and hydraulic actuators). Further, control subsystem 44 may include an electric control subsystem when it is desired for robotic arm subsystem 26 to effectuate highly-accurate movement (as electric actuators tend to be more accurate and precise than pneumatic and hydraulic actuators). Additionally, control subsystem 44 may include a hydraulic control subsystem when it is desired for robotic arm subsystem 26 to effectuate high-capacity movement (as hydraulic actuators tend to have higher lift capacity than electric and pneumatic actuators).

Naturally, the configuration of control subsystem 44 may vary depending upon the manner in which control subsystem 44 is configured, as discussed below:

If control subsystem 44 includes a pneumatic control subsystem configured for pneumatic actuation, control subsystem 44 may include one or more of: pneumatic controls (generally represented as controls 46); one or more pneumatic actuators (generally represented as joint assemblies 30, 34, 38 and any longitudinally-extendable actuators (not shown) within arms assemblies 32, 36); air compressor (generally represented as pump 48); and air storage tank (generally represented as tank 50).

If control subsystem 44 includes an electric control subsystem configured for electric actuation, control subsystem 44 may include one or more of: electronic controls (generally represented as controls 46); and one or more electronic actuators (generally represented as joint assemblies 30, 34, 38 and any longitudinally-extendable actuators (not shown) within arms assemblies 32, 36).

If control subsystem 44 includes a hydraulic control subsystem configured for hydraulic actuation, control subsystem 44 may include one or more of: hydraulic controls (generally represented as controls 46); one or more hydraulic actuators (generally represented as joint assemblies 30, 34, 38 and any longitudinally-extendable actuators (not shown) within arms assemblies 32, 36); hydraulic pump (generally represented as pump 48); and hydraulic fluid storage tank (generally represented as tank 50).

As discussed above, mounting subsystem 12 may be used as a mounting point for all of the systems/subsystems of detachable, self-contained robotic arm system 10, thus allowing detachable, self-contained robotic arm system 10 to be easily attached to (and detached from) operating platform 14 as a single/solitary unit. Accordingly, detachable, self-contained robotic arm system 10 may include connectivity subsystem 52 coupled (i.e., directly or indirectly) to mounting subsystem 12 and configured to detachably couple detachable, self-contained robotic arm system 10 to one or more external systems 54.

For example, connectivity subsystem 52 may include data connectivity subsystem 56 configured to effectuate communication between detachable, self-contained robotic arm system 10 and an external control device 58. Examples of data connectivity subsystem 56 may include but are not limited to a hardwired network connection (e.g., an ethernet connection) and a wireless network connection (e.g., a WiFi connection or a Bluetooth connection). Examples of external control device 58 may include but are not limited to an operator control panel, a personal computer, a laptop computer, a tablet computer, and a smart phone.

Further, connectivity subsystem 52 may include power connectivity subsystem 60 configured to provide external power 62 to detachable, self-contained robotic arm system 10. Examples of power connectivity subsystem 60 may include but are not limited to a socket assembly configured to provide power to detachable, self-contained robotic arm system 10. Examples of external power 62 may include power that is provided by a cable coupled to a power source (e.g., an electrical outlet or a breaker panel).

Detachable, self-contained robotic arm system 10 may include machine vision system 64 configured to enable a user (not shown) of detachable, self-contained robotic arm system 10 to visually monitor areas proximate detachable, self-contained robotic arm system 10. Examples of machine vision system 64 may include any currently available machine vision systems, such a visible light system, UV/IR systems, LIDAR systems, RADAR systems, and thermal imaging systems.

Additionally/alternatively, vision system 64 may be configured to provide collision avoidance of robotic arm subsystem 26 with proximate people and/or objects. Additionally/alternatively, vision system 64 may be configured to provide proximity detection for safety purposes to e.g., slow down, redirect and/or stop the movement of robotic arm subsystem 26 when a person or object is proximate the moving pieces of robotic arm subsystem 26 and/or its payload. Such a collision avoidance and/or proximity detection system may be configured to augment the existing proximity sensors on operating platform 14 to which detachable, self-contained robotic arm system 10 is releasably attached.

Detachable, self-contained robotic arm system 10 may include audio system 66 configured to enable a user (not shown) of detachable, self-contained robotic arm system 10 to audibly monitor areas proximate detachable, self-contained robotic arm system 10. Examples of audio system 66 may include any currently available microphone systems, such a discrete microphones and/or microphone arrays.

To properly position machine vision system 64 and/or audio system 66 with respect to detachable, self-contained robotic arm system 10, machine vision system 64 and/or audio system 66 may be mounted on mast assembly 68 coupled (i.e., directly or indirectly) to mounting subsystem 12. Through the use of mast assembly 68, an elevated point of view may be achieved with respect to the moving parts of detachable, self-contained robotic arm system 10, thus providing situational awareness to avoid collision and/or permit safe operation by humans within the reachable proximity of the moving parts of detachable, self-contained robotic arm system 10 and/or its payload.

Machine vision system 64 may be configured to include multiple/additional machine vision systems (e.g., multiple/additional cameras). Accordingly, one or more additional cameras may be positioned along robotic arm subsystem 26. For example, these additional cameras may be mounted on robotic arm subsystem 26 and may provide visual target identification for object pick-up and/or positioning, as well as proximate object detection to allow for safe operation of robotic arm subsystem 26 near moving and stationary objects. An example of such a machine vision system may include but is not limited to the Intel® RealSense™ D435 depth camera.

Figure 2:
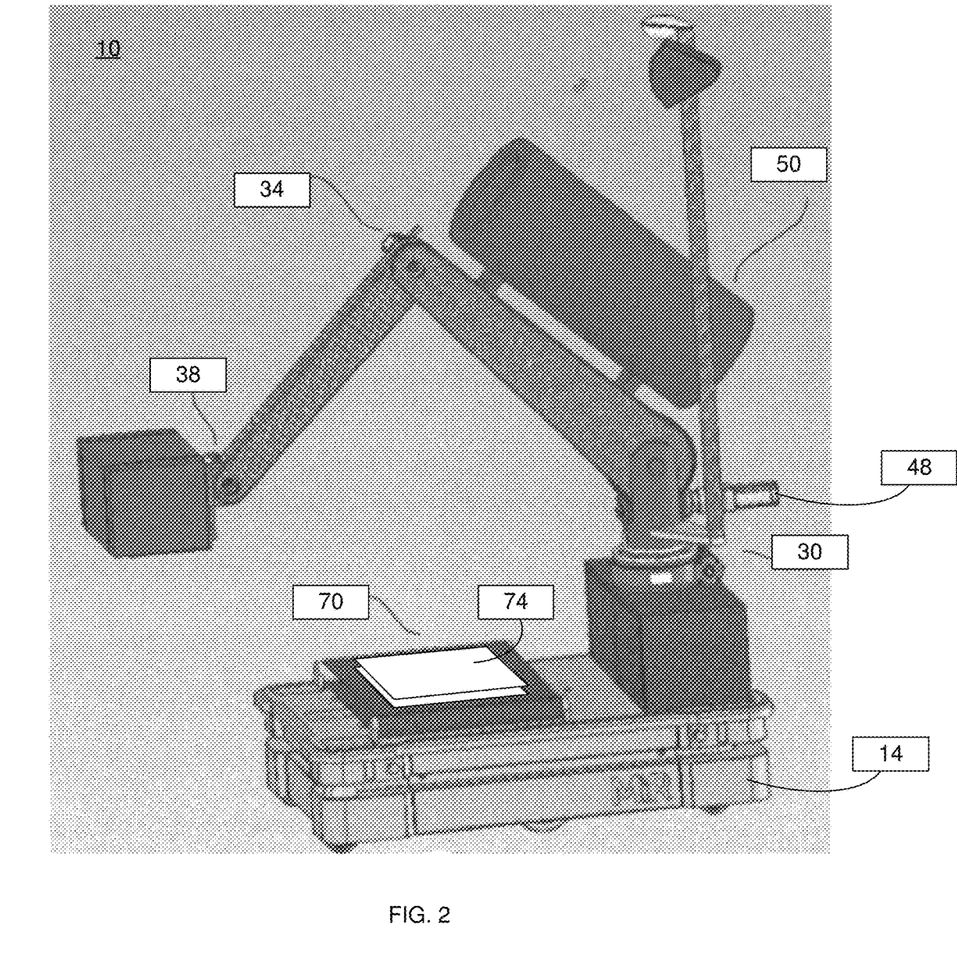
FIG. 2 is another isometric view of a detachable, self-contained robotic arm system according to an embodiment of the present disclosure.
Figure 3:
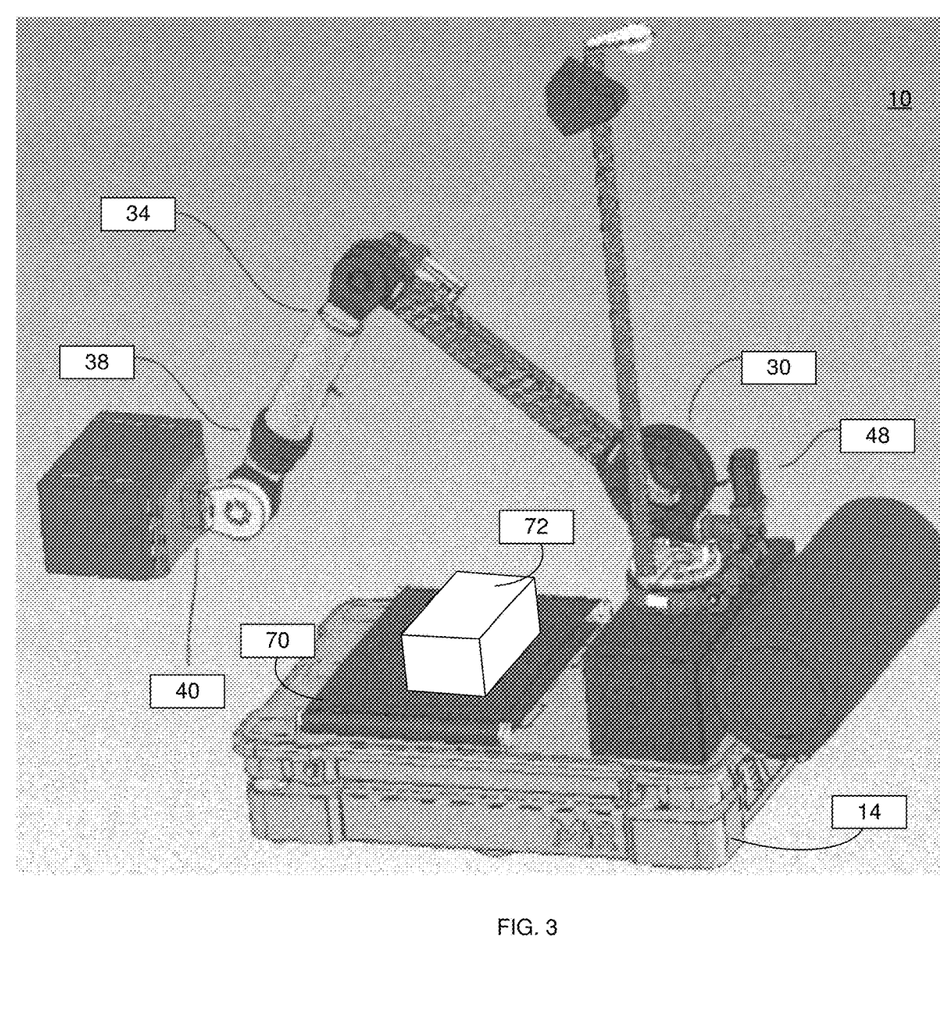
FIG. 3 is another isometric view of a detachable, self-contained robotic arm system according to an embodiment of the present disclosure.

Referring also to FIG. 2-3, detachable, self-contained robotic arm system 10 may be configured to enable easier offloading of objects (e.g., object 72) from operating platform 14. For example, detachable, self-contained robotic arm system 10 may include conveyor system 70, wherein conveyor system 70 may be configured to receive objects from and/or provide objects to robotic arm subsystem 10.

For example, as detachable, self-contained robotic arm system 10 retrieves objects (e.g., object 72), these objects (e.g., object 72) may be placed onto conveyor system 70, wherein operating platform 14 (e.g., when configured as a mobile base) may navigate to an unloading platform (not shown) that may be configured as e.g., a shelf, a slide or another conveyor belt), thus allowing conveyor system 70 to transfer these objects (e.g., object 72) to the unloading platform (not shown). Further, conveyor system 10 may be configured to receive pallets (e.g., pallet 74), wherein detachable, self-contained robotic arm system 10 may retrieve objects (e.g., object 72) that are placed onto pallet 74. Once pallet 74 is fully loaded, pallet 74 may be offloaded from operating platform 14 via conveyor system 70. In such a configuration, the unloading platform (not shown) may be an automated wrapping station (not shown) configured to e.g., shrink wrap pallet 74 and the objects positioned thereon.

A slew ring is shown which serves as joint A for the arm. This provides a pivoting motion for the base of the arm relative to the robot and the control box. Note that in this embodiment the motor powering the slew ring is placed above and along the main axis of the electronics control box and mounting bracket attached to the slew ring base which allows the vertical observation post, to pivot with the motion of the arm. This allows continuous observation of the arm and payload and to avoid collision of the moving arm with the observation post.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A detachable, self-contained robotic arm system comprising:
    a mounting subsystem configured to releasably engage an operating platform, wherein the operating platform is an autonomous mobile base;
    a slew ring coupled to the mounting subsystem;
    a robotic arm subsystem coupled to the mounting subsystem using the slew ring, wherein the robotic arm subsystem is directly coupled to a mounting bracket extending perpendicularly from a base of the slew ring, wherein the slew ring pivots the robotic arm subsystem relative to the mounting subsystem;
    a first machine vision subsystem mounted on a mast assembly coupled directly to the slew ring, wherein the first machine vision subsystem is configured to pivot with the robotic arm subsystem during motion of the robotic arm subsystem and to enable visually monitoring of areas proximate the detachable, self-contained robotic arm system;
    a control subsystem coupled to the mounting subsystem and configured to effectuate movement of the robotic arm assembly using the first machine vision subsystem; and
    a connectivity subsystem configured to detachably couple the detachable, self-contained robotic arm system to one or more external systems.

2. The detachable, self-contained robotic arm system of claim 1 wherein the connectivity subsystem includes one or more of:
    a data connectivity subsystem configured to effectuate communication between the detachable, self-contained robotic arm system and an external control device; and
    a power connectivity subsystem configured to provide external power to the detachable, self-contained robotic arm system.

3. The detachable, self-contained robotic arm system of claim 1 wherein the control subsystem includes one or more of:
    a pneumatic control subsystem;
    a electric control subsystem; and
    a hydraulic control subsystem.

4. The detachable, self-contained robotic arm system of claim 3 wherein the control subsystem includes the pneumatic control subsystem with one or more of:
    pneumatic controls;
    one or more pneumatic actuators;
    an air compressor; and
    an air storage tank.

5. The detachable, self-contained robotic arm system of claim 3 wherein the control subsystem includes the electric control subsystem with one or more of:
    electronic controls; and
    one or more electronic actuators.

6. The detachable, self-contained robotic arm system of claim 3 wherein the control subsystem includes the hydraulic control subsystem with one or more of:
    hydraulic controls;
    one or more hydraulic actuators;
    a hydraulic pump; and
    a hydraulic fluid storage tank.

7. The detachable, self-contained robotic arm system of claim 1 further comprising:
    an audio system configured to enable a user of the detachable, self-contained robotic arm system to audibly monitor areas proximate the detachable, self-contained robotic arm system.

8. The detachable, self-contained robotic arm system of claim 1 further comprising:
    a conveyor system.

9. The detachable, self-contained robotic arm system of claim 8 wherein the conveyor system is configured to receive objects from and/or provide objects to the robotic arm subsystem.

10. The detachable, self-contained robotic arm system of claim 8 wherein the conveyor system is configured to receive a pallet.

11. The detachable, self-contained robotic arm system of claim 1 wherein the mounting subsystem is configured to releasably engage the operating platform with one or more of:
    releasable fasteners;
    releasable clamps; and
    releasable grasping assemblies.

12. The detachable, self-contained robotic arm system of claim 1 wherein the robotic arm subsystem includes one or more of:

an arm base assembly;
a shoulder joint assembly coupled to the arm base assembly;
an upper arm assembly coupled to the should joint assembly;
an elbow joint assembly coupled to the upper arm assembly;
a lower arm assembly coupled to the elbow joint assembly;
a wrist joint assembly coupled to the lower arm assembly; and
a gripper assembly coupled to the wrist joint assembly.

13. The detachable, self-contained robotic arm system of claim 12 wherein the robotic arm subsystem including the shoulder joint assembly is configured to enable rotation about one or more of the X, Y and Z axis.

14. The detachable, self-contained robotic arm system of claim 12 wherein the robotic arm subsystem including the elbow joint assembly is configured to enable rotation about one or more of the X, Y and Z axis.

15. The detachable, self-contained robotic arm system of claim 12 wherein the robotic arm subsystem including the wrist joint assembly is configured to enable rotation about one or more of the X, Y and Z axis.

16. A detachable, self-contained robotic arm system comprising:
a mounting subsystem configured to releasably engage an operating platform, wherein the operating platform is an autonomous mobile base;
a slew ring coupled to the mounting subsystem;
a robotic arm subsystem coupled to the mounting subsystem using the slew ring, wherein the robotic arm subsystem is directly coupled to a mounting bracket extending perpendicularly from a base of the slew ring, wherein the slew ring pivots the robotic arm subsystem relative to the mounting subsystem;
a first machine vision subsystem mounted on a mast assembly coupled directly to the slew ring, wherein the first machine vision subsystem is configured to pivot with the robotic arm subsystem during motion of the robotic arm subsystem and to enable visually monitoring of areas proximate the detachable, self-contained robotic arm system;
a control subsystem coupled to the mounting subsystem and configured to effectuate movement of the robotic arm assembly using the first machine vision subsystem; and
a connectivity subsystem configured to detachably couple the detachable, self-contained robotic arm system to one or more external systems, wherein the connectivity subsystem includes one or more of:
a data connectivity subsystem configured to effectuate communication between the detachable, self-contained robotic arm system and an external control device, and
a power connectivity subsystem configured to provide external power to the detachable, self-contained robotic arm system.

17. The detachable, self-contained robotic arm system of claim 16 wherein the control subsystem includes one or more of:
a pneumatic control subsystem;
a electric control subsystem; and
a hydraulic control subsystem.

18. The detachable, self-contained robotic arm system of claim 17 wherein the control subsystem includes the pneumatic control subsystem with one or more of:
pneumatic controls;
one or more pneumatic actuators;
an air compressor; and
an air storage tank.

19. The detachable, self-contained robotic arm system of claim 17 wherein the control subsystem includes the electric control subsystem with one or more of:
electronic controls; and
one or more electronic actuators.

20. The detachable, self-contained robotic arm system of claim 17 wherein the control subsystem includes the hydraulic control subsystem with one or more of:
hydraulic controls;
one or more hydraulic actuators;
a hydraulic pump; and
a hydraulic fluid storage tank.

21. The detachable, self-contained robotic arm system of claim 16 further comprising:
a conveyor system.

22. The detachable, self-contained robotic arm system of claim 21 wherein the conveyor system is configured to receive objects from and/or provide objects to the robotic arm subsystem.

23. The detachable, self-contained robotic arm system of claim 21 wherein the conveyor system is configured to receive a pallet.

24. A detachable, self-contained robotic arm system comprising:
a mounting subsystem configured to releasably engage an operating platform, wherein the operating platform is an autonomous mobile base;
a slew ring coupled to the mounting subsystem;
a robotic arm subsystem coupled to the mounting subsystem using the slew ring, wherein the robotic arm subsystem is directly coupled to a mounting bracket extending perpendicularly from a base of the slew ring, wherein the slew ring pivots the robotic arm subsystem relative to the mounting subsystem;
a first machine vision subsystem mounted on a mast assembly coupled directly to the slew ring, wherein the first machine vision subsystem is configured to pivot with the robotic arm subsystem during motion of the robotic arm subsystem and to enable visually monitoring of areas proximate the detachable, self-contained robotic arm system;
a control subsystem coupled to the mounting subsystem and configured to effectuate movement of the robotic arm assembly using the first machine vision subsystem; and
a connectivity subsystem configured to detachably couple the detachable, self-contained robotic arm system to one or more external systems, wherein the connectivity subsystem includes one or more of:
a data connectivity subsystem configured to effectuate communication between the detachable, self-contained robotic arm system and an external control device, and
a power connectivity subsystem configured to provide external power to the detachable, self-contained robotic arm system;
wherein the control subsystem includes one or more of:
a pneumatic control subsystem;
an electric control subsystem; and
a hydraulic control subsystem.

25. The detachable, self-contained robotic arm system of claim 24 wherein the control subsystem includes the pneumatic control subsystem with one or more of:

pneumatic controls;
one or more pneumatic actuators;
an air compressor; and
an air storage tank.

26. The detachable, self-contained robotic arm system of claim 24 wherein the control subsystem includes the electric control subsystem with one or more of:
electronic controls; and
one or more electronic actuators.

27. The detachable, self-contained robotic arm system of claim 24 wherein the control subsystem includes the hydraulic control subsystem with one or more of:
hydraulic controls;
one or more hydraulic actuators;
a hydraulic pump; and
a hydraulic fluid storage tank.

* * * * *